Jan. 1, 1957 F. P. KEIPER, JR 2,776,375

PULSE SYSTEM

Filed Aug. 4, 1955

INVENTOR.
FRANCIS P. KEIPER
BY
Allen V. Hazeltine
ATTORNEY

United States Patent Office 2,776,375

Patented Jan. 1, 1957

2,776,375

PULSE SYSTEM

Francis P. Keiper, Jr., Elkins Park, Pa., assignor to Philco Corporation, Philadelphia, Pa., a corporation of Pennsylvania Application August 4, 1955, Serial No. 526,403

15 Claims. (Cl. 250—36)

The present invention relates to electrical circuits utilizing semiconductive devices, and particularly to transistor pulse-forming and generating circuits.

Vacuum-tube circuits of the multivibrator or blocking-oscillator type are known which are capable of generating pulse type signals, either in response to triggering impulses or as free-running oscillators. Such circuits are useful, for example, for timing, pulse delay, or pulse control circuits in such widely diversified fields as televison, radar and computer devices. Forms of such circuits utilizing transistors instead of vacuum tubes are also known, which provide the well known benefits including small size, weight and input power, as well as circuit simplicity usually obtained from transistorization.

While adequate for many purposes, such transistorized multivibrator or blocking-oscillator circuits commonly produce pulses having durations relatively sensitive to changes in the temperature of the transistor device. This is primarily because the durations of the pulses in such arrangements depend upon the time required for current to flow from a reactive element through the resistance provided by the emitter of a transistor device, whereas the resistance of the emitter of such a device is a relatively strong function of operating temperature. Thus, for higher temperatures a larger current flows through the emitter for a given applied voltage, and the time required for discharge of the reactive network associated therewith is thereby substantially reduced, resulting in a shorter pulse duration; for lower temperatures the emitter current is less, resulting in a substantially longer pulse duration. Because of this effect, pulse duration variations of as much as 100% for an 8° C. rise above room temperature have been common. Such sensitivity of the pulse duration to temperature changes is clearly highly undesirable in many applications in which accuracy of timing is of importance.

Furthermore, it is often highly desirable to be able to control readily and accurately the durations of pulses produced by such devices. As an example, such a feature permits the generation of pulses controllably delayed with respect to trigger pulses by utilizing the trigger pulses to initiate pulses of variable width and deriving the delayed pulses from the trailing edges of the variable-width pulses.

Accordingly, it is an object of my invention to provide a transistor wave-form generating circuit of novel form.

Another object is to provide such a circuit which is relatively insensitive to variations in operating temperature.

A further object is to provide such a circuit which is simple and inexpensive.

Still another object is to provide a novel circuit for producing a substantially rectangular pulse of predetermined duration in response to a supplied trigger pulse.

Another object is to provide such a circuit which is readily controllable to vary the duration of said pulse generated thereby.

It is another object to provide transistor apparatus for producing pulses controllably delayed with respect to reference pulses applied thereto.

A further object is to provide a novel transistor circuit for generating non-sinusoidal oscillations.

In accordance with the invention, the above objectives are achieved by providing a circuit comprising a transistor having an inductive element in series with its collector element and with a source of supply potential, so that, upon the sudden occurrence of a low-impedance condition at the collector, there will be produced a pulse of voltage across, and a gradually increasing current through, the inductive element. Regenerative feedback means are also provided which are responsive to the occurrence of such a voltage pulse to produce an emitter current in the transistor which at least momentarily is greater than the saturation level and hence tends to produce and perpetuate the above-mentioned low-impedance condition at the collector together with the resultant voltage pulse, until the collector voltage has risen sufficiently to produce desaturation. In addition there is provided a resistive element in series in the path through which at least the principal component of emitter current is constrained to flow during the saturation interval, the value of which element serves to determine the magnitude of the emitter current and hence the collector current values at which desaturation occurs. Preferably, but not necessarily, an asymmetrically-conductive device is connected across the inductive element in a polarity to provide a high resistance for the polarity of voltage existing across the inductive element under quiescent bias conditions, but a low resistance for the opposite polarity in which heavy collector current is flowing.

In operation, when the emitter becomes conductive a step-wave of voltage is produced across the inductive element in the collector circuit, and the collector current begins to rise substantially linearly. The pulse of voltage produced across the inductive element and fed back regeneratively to the emitter then causes the emitter to pass a current determined by the magnitude of the feedback voltage and the value of the resistance in series with the emitter, and substantially independent of the internal resistance of the emitter diode itself. This condition obtains until the collector current rises to a value approximately equal to the product of the emitter current times the $\alpha$ of the transistor, at which time the collector ceases to operate in its highly saturated region, the collector impedance rises abruptly, the collector current begins to fall and, by regenerative action, the emitter voltage is driven negative again so as to cut off the transistor and return the collector voltage to its original value. The voltage of the collector then comprises a substantially rectangular pulse produced during the interval of heavy conduction therein and having a duration controllable by variation of the value of the resistance in series with the emitter. During the interval of low conduction following the occurrence of each such pulse, the collector voltage tends to swing in the reverse direction, and where this swing would be so great as to approach closely or exceed the breakdown voltage of the collector, the above-mentioned diode is preferably employed to short-circuit, or damp out, the negative voltage pulse.

In one application, the circuit may be utilized as a delay device by applying a trigger pulse thereto to initiate the rectangular voltage pulse, and by utilizing the occurrence of the trailing edge of the voltage pulse as the delayed indication. In this case the emitter of the transistor is normally biased in such a way as to make the transistor substantially non-conductive in the absence of trigger pulses. However, it is also possible to utilize the circuit as a free-running pulse generator by supplying the emitter with a quiescent bias sufficient to produce an appreciable degree of conductance and power gain in the transistor.

It will therefore be appreciated that, in the circuit of the invention, the transistor is in its state of high conduction during the time of occurrence of the rectangular pulse at the collector thereof, and, while the duration of the collector pulse is dependent upon the current then flowing through the emitter, the latter current is determined in large measure by the external circuit resistance in series therewith. With a series resistance of sufficiently high value, changes in the effective resistance of the emitter contact due to temperature variations are substantially ineffective to vary the emitter current, and the duration of the collector-voltage pulse therefore also remains substantially fixed. However, this duration is readily controlled merely by variation of the value of the series resistance.

Other objects and features of the invention will be readily comprehended from a consideration of the following detailed description, taken in conjunction with the accompanying drawings, in which.

Figure 1:
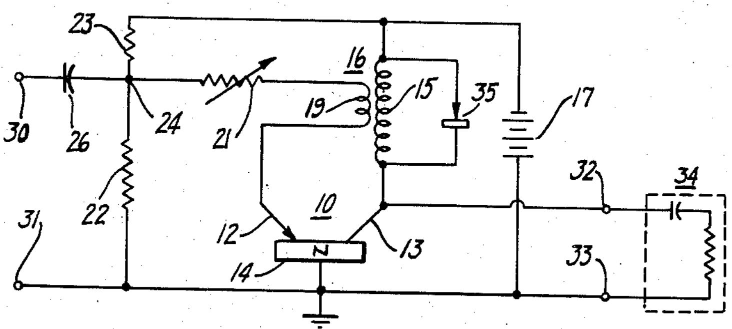
Figure 1 is a schematic diagram of a circuit arrangement embodying the invention.

Referring to Figure 1 in detail, the circuit shown is for producing a rectangular pulse of controllable duration in response to an applied trigger pulse, and comprises a transistor 10 having emitter, collector and base elements 12, 13 and 14, respectively, a collector circuit therefor comprising an inductor 15 in the form of the primary of a transformer 16, connected in series with a source of negative potential 17 between collector 13 and base 14, and an emitter circuit comprising an inductor 19 in the form of the secondary winding of transformer 16, connected in series with variable resistor 21 and a bias-supplying resistor 22, between emitter 12 and base 14. Bias voltage across resistor 22 is supplied by way of resistor 23, which is connected at its other terminal to the negative terminal of bias supply 17 and forms with resistor 22 a voltage divider.

In the present example, transistor 10 may be of the PNP junction type and for convenience the invention will be described with relation to this form of transistor. However, it will be understood that the invention is in no way limited to use with this form of transistor, as will become apparent from the subsequent discussions.

Input signals for triggering the device are supplied between base 14 and the common terminal 24 of resistors 22 and 23, by way of a suitable coupling capacitor 26, while output signals may be derived between collector element 13 and base element 14. Elements 30 and 31 therefore comprise the input terminals to the circuit, while elements 32 and 33 comprise the corresponding output terminals at which the rectangular pulses are produced and supplied to any appropriate utilization device. Where it is desired to produce pulses corresponding to the trailing edges of the rectangular output pulses, a differentiating circuit such as the conventional resistance-capacitance network 34 may be provided at the output terminals, as shown. In the present embodiment, a rectifying element 35, such as a crystal diode, is also provided in parallel with inductive element 15 with its cathode connected to collector 13, for reasons discussed in detail hereinafter.

Figures 2A, 2B, 2C, 2D, 2E, 2F:
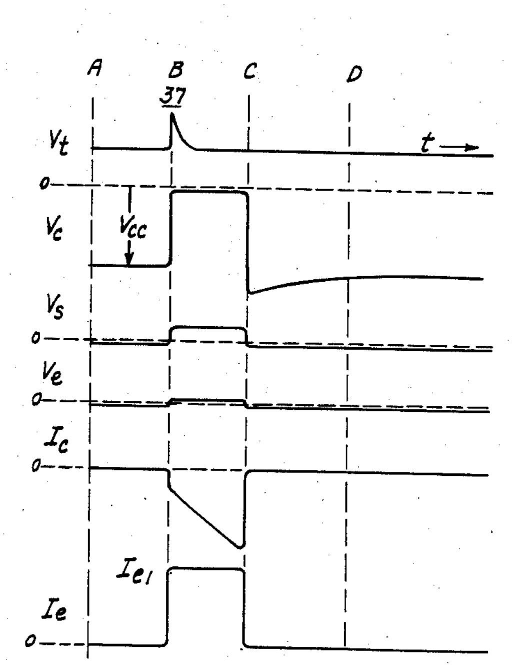
Figures 2A to 2F are graphical illustrations representing the waveforms produced at various points in the circuit of Figure 1.

Referring now also to the graphical representations of Figures 2 and 3, the operation of the circuit of Figure 1 is as follows. Prior to the application of a trigger pulse, the transistor 10 is supplied with the quiescent values of voltage and current shown by the portions AB of the curves of Figures 2A to 2F, wherein ordinates represent voltages or currents and abscissae represent time to a common scale; the corresponding operating point of the collector of transistor 10 is shown at *a* in Figure 3, wherein ordinates and abscissae represent collector voltage and collector current, respectively. In the interval AB, the bias voltage at common connection 24 is sufficient to hold transistor 10 in a substantially non-conducting condition, and as shown in Figure 2B the collector voltage $V_c$ is then substantially equal to the negative supply voltage $V_{cc}$. During the same time interval, and as shown in Figure 2C, the voltage $V_s$ developed across the secondary winding 19 of transformer 16, is substantially zero, although it may be slightly negative, as shown, due to the slight resistance of the winding 19. The voltage $V_e$ of emitter 12 with respect to base 14 is then slightly negative as shown in Figure 2D, and both the collector current $I_c$ and the emitter current $I_e$, as shown in Figures 2E and 2F respectively, are substantially zero.

Figure 3:
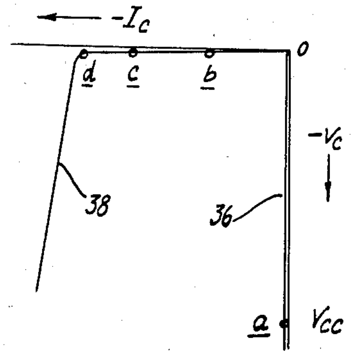
Figure 3 is a graphical representation to which reference will be made in explaining the mode of operation of the circuit of the invention.

The corresponding quiescent operating point of the collector of transistor 10 is then as shown by the circle at *a* of Figure 3, which is situated on a curve 36 corresponding to substantially zero emitter current and a very low corresponding value of collector current, and at a collector voltage which is substantially equal to the supply value $V_{cc}$.

However, upon the application to the input terminals 30—31 of the trigger pulse 37 of amplitude $V_t$, occurring at time B as shown in Figure 2A, each of the voltages and currents shown is modified in the following manner. The trigger pulse applied to the emitter circuit causes the emitter voltage $V_e$ of Figure 2D to rise sufficiently to produce a substantial increase in the collector current $I_c$ as shown in Figure 2E. A voltage change is thereby produced across the primary winding 15 of transistor 16, as the negative collector voltage $V_c$ of Figure 2B falls toward zero. This positively-directed change in collector voltage is fed back by way of transformer 16 to the secondary winding 19 thereof, producing a positive-going change in the secondary voltage $V_s$ as shown in Figure 2C, a portion of which voltage is supplied to emitter 12 in regenerative phase to increase further the voltage $V_e$ applied thereto, as well as the current $I_e$ therethrough. This regenerative action of voltages and currents causes the operating point of the transistor to pass rapidly through its transitional state to a second stable state existing during the interval BC and corresponding to the operating points *b*, *c*, *d* of Figure 3.

During this second stable interval, conditions are as follows. Due to the above-described regenerative action, the emitter current as shown in Figure 2F has risen to the large value $I_{e1}$, causing the transistor to be turned on so strongly that the impedance to collector current flow is extremely low and, in fact, the minority carriers injected by the emitter under these initial conditions are so numerous that the transistor is momentarily in a state commonly referred to as the "saturation" condition, in which the collector current is insufficient to remove the large number of injected carriers. Due to the low collector impedance, the collector potential $V_c$ is substantially at zero potential at this time, as shown in Figure 2B, while the collector current $I_c$ through inductor 15 is building up substantially linearly, from a low initial value required to supply the emitter current, to its final maximum value as shown in Figure 2E. This linearly-increasing collector current through inductor 15 continues to produce an induced voltage $V_s$ in the secondary 19 of substantially uniform amplitude as shown in Figure 2C, and the above-mentioned relatively large emitter current $I_{e1}$ of substantially uniform value is thereby provided. Since series resistor 21 is preferably adjusted to a value sufficiently large to determine the emitter current substantially independently of the internal emitter-to-base resistance of transistor 10, the emitter current is substantially constant during the interval of saturation despite variations in temperature.

However, at the time C when the collector current $I_c$ has increased to a value substantially equal to $\alpha$ times $I_e$, the transistor is no longer saturated and the impedance to collector current flow assumes its usual, relatively large value. As soon as this occurs, the rate of collector current build-up decreases abruptly, causing a corresponding diminution in the voltage induced in secondary 19, and a consequent reduction in the emitter voltage and current. Due to the regenerative polarity of the feedback connections, this reduction in the emitter current further reduces the collector current, and each of the voltages and currents in Figures 2A to 2F is rapidly driven back toward the original value which it possessed prior to the occurrence of the trigger pulse. However, because of the energy stored in the magnetic field of the transformer, the collector voltage $V_c$ tends to swing far below its original value $V_{cc}$ when the collector current is thus suddenly cut off and, in the absence of diode 35, will in fact do so. Since in some cases this negative swing may be so great as to bias the collector close to or beyond its breakdown voltage, diode 35 is preferably employed to severely damp this negative swing by its heavy conduction during this time, permitting the relatively small, remanent negative swing shown beginning at time C in Figure 2B.

In terms of the parameters displayed in Figure 3, the operation of the circuit is one of moving the operating point from its original position at *a* prior to triggering, to the successive positions *b*, *c* and *d* situated in the saturation region of a characteristic curve 38 corresponding to that substantially constant value of emitter current permitted by resistor 21, until the collector current reaches the knee of the characteristic shown just beyond *d* in Figure 3. At that time, desaturation occurs, as shown by the abrupt increase in slope of line 38, and the above-described regenerative action then causes the operating point to shift quickly back to the original operating point at *a*.

The advantages obtained by the use of emitter resistor 21 may now be more fully appreciated. As an example, a transistor such as the ordinary germanium PNP alloyed-junction transistor may have an emitter saturation current of the order of 2 milliamperes at a temperature of about 25° C. In the absence of resistor 21, an increase in transistor temperature of less than 10° C. typically will cause the emitter saturation current to double for the same emitter voltage. Since the knee of the collector voltage-collector current curve then also occurs at a correspondingly higher current, the time required for the collector current to build up to its maximum value, and hence the pulse duration, is also doubled. However, when in accordance with the invention the element 21 having substantial resistance is connected in series between the emitter and base of the transistor 10 and in series with the secondary winding 19, the current through the emitter contact 12 is substantially independent of the internal emitter-to-base resistance of transistor 10. This is because this current depends upon the ratio of the applied voltage developed across secondary 19 to the total series resistance of the emitter-to-base current loop, while the resistance to current flow between the emitter and base by way of transistor 10 is but a small part of this total resistance. Substantial variations in the effective resistance of the emitter 12 therefore have little effect upon the emitter current. In fact, the effects of temperature change upon the emitter current are reduced approximately in the ratio of the value of the total series circuit resistance to the effective emitter resistance. Thus temperature variations which, in the absence of the stabilizing resistance provided hereby, would cause the emitter current to vary from 0.2 to 0.4 milliamperes for a 100% change, will produce only about a 2% current change when the total series resistance is about 50 times the effective resistance of the emitter contact as may be readily provided.

In terms of the parameters displayed in Figure 3, the effect of resistance 21 is to limit operation to a preselected collector voltage-collector current characteristic corresponding to a chosen value of emitter current. In the absence of such a series resistance, the operating curve 38 will vary in lateral position in response to temperature changes according to the value of emitter current, and the position of the knee of the curve at *d* and hence the pulse duration will also vary correspondingly. However, with a value of resistance 21 large compared to the emitter resistance, substantially the same characteristic, corresponding to a single preselected value of emitter current, is traced during operation despite temperature changes. By changing the value of resistance 21, different $I_c$—$V_c$ operating characteristics may be selected, setting the position of the knee *d* and hence the pulse duration at any of a large number of preselected different values.

Although not limited thereto, the embodiment of Figure 1 may utilize the following specific values of circuit parameters in one particular example. The transistor 10 may be a PNP germanium alloy-junction transistor, for which the supply source 17 may be a battery producing 6 volts of negative potential. The inductor 15 comprising the primary of transformer 16 may have an inductance of the order 5 henries, while the secondary may have an inductance of about 0.3 henry, providing a step-down voltage ratio of 4 to 1. Resistors 22 and 23 may have values of 150 ohms and 5600 ohms respectively, providing a voltage at interconnection 24 of approximately 0.16 volt negative with respect to base. Coupling capacitor 26 may suitably have a value of about 0.01 microfarad when the triggering pulse has substantially the form shown in Figure 2A; however, in cases in which the applied pulse is of rectangular form and is to be differentiated in order to provide the desired narrow trigger pulse, capacitor 26 may be reduced sufficiently to provide a differentiating action in conjunction with resistor 22, in a manner well known in the art. The exact duration of the triggering pulse is not critical, so long as it provides sufficient time for the above-described regeneration by way of the feedback transformer to occur. As an example, triggering pulses of about 20 microseconds duration have been employed with satisfactory results.

In a typical case in which the transistor 10 has an emitter characteristic such that emitter currents of about one milliampere are produced at about 0.2 volt between emitter and base, variable resistor 21 may comprise a resistance element variable from zero to 5000 ohms. With resistor 21 adjusted near its maximum value, pulses of about 6000 microseconds duration may readily be obtained, with temperature stability factors of about 50 to 1, and, as the value of resistance 21 is decreased, pulse durations down to about 250 microseconds may be readily obtained, with somewhat less temperature stability improvement. In this connection it is noted that the parallel combination of resistors 22 and 23 is in series with resistor 21 between emitter and base, and may be considered as providing an equivalent minimum resistance in series with the emitter; this equivalent resistance should be taken into account in selecting the value of resistor 21 for any particular application.

The operation of the differentiating network 34 is entirely conventional, and results in the production across the resistive element thereof of a positive voltage pip coincident with the occurrence of the leading edge of the collector-voltage pulse, and a negative pip coincident with the occurrence of the trailing edge thereof. The negative pip is therefore delayed with respect to the trigger pulse by an amount determined by the value of resistor 21. As is well known, the time constant of the differentiating circuit should be short compared to the duration of the pulse applied thereto, to obtain the desired differentiating action. For a pulse duration of several hundred microseconds, the values of the capacitor and resistor may suitably be 1,000 micromicrofarads and 10,000 ohms, respectively.

Triggering of the circuit may also be accomplished by means of pulses applied to the emitter side of winding 19, or even to collector 13. Also, all or a part of resistor 21 may be located on the emitter side of winding 19 without materially altering the operation of the circuit.

By reducing the quiescent emitter-to-base bias, it is possible to cause the circuit of Figure 1A to operate continuously, without triggering, as a free-running pulse generator. In the specific example set forth above, but with diode 35 disconnected, free-running oscillations may be obtained when the bias at interconnection 24 is adjusted to be about zero volts, providing collector voltage pulses of the general form shown in Figure 2B with a repetition rate which may conveniently be about 1,000 pulses per second in this example.

The operation of the circuit is then basically similar to that of the triggered form described above, except that the quiescent emitter and collector currents and voltages are sufficient to provide regenerative action when the collector voltage returns to its quiescent value after the negative swing following each collector voltage pulse. The duration of the negative swing is therefore of significance in this application, since it affects the frequency of pulse repetition. The nature of this negative swing and of the return of the collector voltage toward the quiescent value is typical of that conventionally produced by the discharge of stored energy when current through an inductance is suddenly cut off, and therefore need not be described in detail except to point out that the duration of the internal between collector current pulses tends to be greater for larger values of collector current during the pulses, and for larger L/C ratios of the inductor 15. In the usual case in which the duration of the rectangular collector voltage pulse is at least several hundred microseconds, the time required for the collector voltage to recover from its negative excursion is small compared to the pulse duration, and the frequency of pulse repetition is therefore determined primarily by the pulse duration, unless a device such as diode 35 is employed to stretch out the negative swing in the manner shown in Figure 2B.

Figure 4:
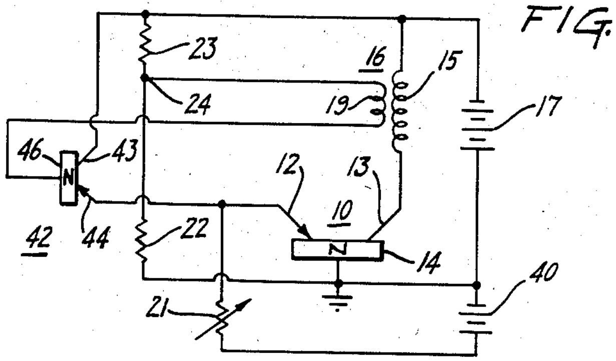
Figure 4 is a schematic representation of another circuit embodying the invention.

Although in the arrangement of Figure 1 the signal fed back from the collector circuit to the emitter circuit is provided directly in series with the current-controlling resistor 21, other arrangements may also be utilized so long as the mechanism employed is operative to produce a substantially constant emitter current in response to the occurrence of the collector voltage pulse, and to provide substantial collector-current cut-off during other intervals. One such possible modification is shown in Figure 4, in which elements corresponding to those of Figure 1 are indicated by corresponding numerals.

In this example the transistor 10 and the collector circuit comprising inductor 15 and potential source 17 may be constituted and arranged in substantially the same manner as in Figure 1. Regenerative feedback from the collector is again provided by means of a transformer 16 and associated secondary winding 19, but the arrangements for controlling the voltage and current at emitter 12 are different. With this circuit, the emitter bias is determined by the combination of two effects, the first of which is the forward-biasing effect of an additional potential source 40 and the associated variable series resistor 21, connected between emitter 12 and base 14 and corresponding in function to resistor 21 of Figure 1. When the current flow through emitter 12 is primarily in response to potential from source 40, the transistor is in a highly conducting condition, and a large collector current can then flow.

However, the net bias of emitter 12 is also determined by the effect of a connection to the negative terminal of source 17 by way of a second transistor 42, the collector 43 of which is connected to said negative terminal and the emitter 44 of which is directly connected to emitter 12. When transistor 42 is in its highly conductive condition, the negative potential source 17 overcomes the potential from source 40, and produces a reverse bias at emitter 12 which substantially cuts off collector current in transistor 42. On the other hand, when transistor 42 is in its non-conductive condition, the source 17 is effectively isolated from emitter 12, and the positive potential supplied by source 40 predominates and produces strong conduction in transistor 10, as mentioned hereinabove.

The feedback circuit is therefore arranged to cause transistor 42 to be normally conductive, but to become non-conductive during the occurrence of each positive pulse of voltage at collector 13. To this end, resistors 22 and 23 connected between the negative terminal source 17 and the base 14 of transistor 10 are so selected that the quiescent voltage at the interconnection 24 is sufficiently negative normally to hold transistor 42 in its highly conductive condition, thereby supplying emitter 12 of transistor 10 with a highly negative voltage, as is desired for substantial collector-current cutoff. However, upon the occurrence of the voltage pulse across primary winding 15, a corresponding positive pulse is produced across secondary winding 19 which is sufficient to drive the base of transistor 42 into the nonconductive condition, so that the emitter of transistor 12 is rendered conductive by currents supplied from source 40 by way of bias-limiting resistor 41.

The general operation of the arrangement of Figure 4 is therefore sufficiently similar to that of Figure 1 as to require no further detailed explanation, except to point out that in this case the emitter current-determining resistor is resistor 21, which is connected not in series with the secondary 19, but in series with the separate bias source 40. Accordingly, it will be appreciated that it is not essential that the current-determining resistor be in series with the element across which the feedback pulse is developed, so long as it is in series with that source of potential which produces the principal component of emitter current during the interval of heavy conduction in transistor 10.

The invention may also be practiced in other embodiments utilizing types of transistors other than the PNP, such as the surface-barrier transistors or the NPN transistor. When the transistor is of a type such as the NPN having diode elements poled oppositely to those of the PNP, appropriate reversal of the polarities of supplied potential should be made in a manner which will be familiar to one skilled in the art.

Although I have described my invention with particular reference to specific embodiments thereof, it will be understood that it may be given embodiment in any of a variety of other forms without departing from the scope thereof.

I claim:

1. A transistor circuit comprising a transistor having at least emitter, collector and base elements, a collector circuit for said transistor comprising a source of collector operating potential and an inductive element in series with said source and said collector, an emitter circuit for said transistor, means responsive to the occurrence of a voltage pulse developed across said inductive element for increasing the current through said emitter to the saturation level at least during a portion of said pulse, and a resistive element arranged in the path of principal emitter current flow during said pulse for determining the magnitude of said flow.

2. A circuit in accordance with claim 1, in which said means comprises apparatus for feeding back regeneratively, and in series with said resistive element, at least a portion of said voltage pulse developed across said inductor.

3. A circuit in accordance with claim 1, in which said means comprises a source of bias connected to said emitter and sufficient to operate said emitter in the saturation condition, apparatus for normally overcoming said bias and itself responsive to a voltage applied thereto to be rendered inoperative, and means for applying at least a portion of said pulse developed across said inductive element to said apparatus to render it inoperative.

4. A circuit in accordance with claim 3, in which said resistive element is connected in series with said source of bias and said emitter element.

5. A circuit in accordance with claim 1, in which said resistive element is controllably variable in value.

6. A circuit in accordance with claim 1, in which the value of said resistive element exceeds the internal emitter-to-base resistance of said transistor by at least an order of magnitude.

7. A circuit in accordance with claim 1, in which said emitter circuit includes means for biasing said emitter element substantially at collector-current cut-off.

8. A circuit in accordance with claim 1, in which said emitter circuit comprises means for biasing said emitter element to a condition producing substantial power gain in said transistor.

9. A circuit in accordance with claim 1, comprising in addition an asymmetrically-conductive device in parallel with said inductive element and poled so as to be in its higher resistance condition upon strong current flow through said collector element.

10. A transistor wave-form generating circuit, comprising a transistor having at least emitter, collector and base element, a collector circuit for said transistor comprising a source of collector potential and an inductive element connected in series with said collector element, means coupled to said inductive element for feeding back regeneratively to said emitter element signals produced in said collector circuit in sufficient magnitude to drive said emitter into the saturation current region, and a resistive element connected in series with said emitter element for determining the forward current of said emitter element in the saturation condition.

11. A circuit in accordance with claim 10, in which said coupled means comprises a second inductive element electromagnetically coupled to said first-named inductive element, and in series with said resistive element and said emitter element.

12. A transistor wave-form generating circuit, comprising: a transistor having at least emitter, collector and base elements; a collector circuit for said transistor, including a source of collector potential and an inductive element in series between said collector element and said base element, and responsive to the occurrence of saturation in said transistor to produce a pulse of voltage across, and an increasing current through, said inductive element; means for feeding back regeneratively to said emitter element at least a portion of said voltage pulse of sufficient magnitude to maintain said saturation condition for a substantial time interval as said current through said inductive element increases; and resistive means in series with the path of principal emitter current flow during said interval, for determining the magnitude of said emitter current and hence the time required for said current through said inductive element to reach the desaturation level of collector current.

13. The circuit of claim 12, in which said feedback means comprises a transformer having a primary winding in series in said collector circuit and a secondary winding in series with said emitter element, and in which said resistive element is in series with said secondary winding.

14. The circuit of claim 12, comprising in addition a differentiating circuit connected to said collector element for deriving voltage pips upon the occurrences of the trailing edges of voltage pulses occurring at said collector element.

15. The circuit of claim 12, in which said feedback means comprises another transistor also having at least emitter, collector and base elements, means connecting said collector element of said last-named transistor to said source of potential, means connecting together said emitters of said transistors, and a second inductive element coupled to said first inductive element and connected to the base of said last-named transistor for rendering it non-conductive upon the occurrence of said voltage pulse.

References Cited in the file of this patent

UNITED STATES PATENTS 2,728,049 Riddle ---------------- Dec. 20, 1955